United States Patent
Yokoyama

(10) Patent No.: US 7,130,618 B2
(45) Date of Patent: Oct. 31, 2006

(54) METHOD, APPARATUS, AND SYSTEM FOR TRANSMITTING MOVING IMAGE DATA

(75) Inventor: Hirotugu Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 523 days.

(21) Appl. No.: 10/345,330

(22) Filed: Jan. 16, 2003

(65) Prior Publication Data

US 2003/0143985 A1    Jul. 31, 2003

(30) Foreign Application Priority Data

Jan. 31, 2002   (JP)   ............................. 2002-024602

(51) Int. Cl.
*H04M 3/42* (2006.01)
*H04B 1/66* (2006.01)

(52) U.S. Cl. ............................. 455/414.1; 455/414.4; 455/66.1; 375/240.01

(58) Field of Classification Search ............... 455/3.01, 455/3.02, 3.04, 66.1, 344, 414.1, 414.4; 379/428.01, 379/433.01; 375/240.01
See application file for complete search history.

(56) References Cited

U.S. PATENT DOCUMENTS

| | | | | |
|---|---|---|---|---|
| 5,448,568 A | * | 9/1995 | Delpuch et al. | 348/423.1 |
| 5,550,754 A | * | 8/1996 | McNelley et al. | 348/14.01 |
| 5,561,466 A | | 10/1996 | Kiriyama | |
| 5,907,604 A | * | 5/1999 | Hsu | 379/142.06 |
| 6,281,925 B1 | * | 8/2001 | Kosaka | 348/14.02 |
| 6,396,924 B1 | * | 5/2002 | Suso et al. | 379/433.13 |
| 6,424,843 B1 | * | 7/2002 | Reitmaa et al. | 455/566 |
| 6,816,724 B1 | * | 11/2004 | Asikainen | 455/414.1 |
| 6,884,171 B1 | * | 4/2005 | Eck et al. | 463/42 |
| 6,961,446 B1 | * | 11/2005 | Imagawa et al. | 382/103 |
| 2003/0007556 A1 | * | 1/2003 | Oura et al. | 375/240.01 |
| 2004/0209649 A1 | * | 10/2004 | Lord | 455/558 |

FOREIGN PATENT DOCUMENTS

| EP | 1170675 A1 * | 9/2002 |
|---|---|---|
| JP | 8-46723 | 2/1996 |

OTHER PUBLICATIONS

"Communication Protocol Dictionary", Ascii Corporation, pp. 517-519, 521, 531.

* cited by examiner

Primary Examiner—Tilahun Gesesse
(74) Attorney, Agent, or Firm—Foley & Lardner LLP

(57) ABSTRACT

A method, apparatus and system for transmitting moving image data, in which various moving image data of existent media files are efficiently delivered to existent TV cellular phones in reproducible format. A media file storage stores media files created in arbitrary format for filing moving images. A storage stores codec information on voice/image data and the media files as intermediate formatted data. A media file controller multiplexes the intermediate formatted data to generate a bit stream of voice/image data based on the codec information on the voice/image data. The interface converter transmits the bit stream of voice/image data to a TV cellular phone.

10 Claims, 13 Drawing Sheets

METHOD, APPARATUS, AND SYSTEM FOR TRANSMITTING MOVING IMAGE DATA

FIELD OF THE INVENTION

The present invention relates to a method, apparatus and system for transmitting moving image data and, especially, to a method, apparatus and system for transmitting moving image data by cellular phones.

BACKGROUND OF THE INVENTION

Techniques for transmitting moving image data are susceptible of broad application. For example, the techniques have been applied in next-generation cellular phones, and it is possible to send/receive moving images among TV cellular phones while producing moving image data during communications.

In the conventional techniques, however, there has been a problem that media data for moving images created by other devices cannot be reproduced by the function of TV cellular phones realized by H.324 protocol. Consequently, it is necessary to implement a memory in the cellular phone for editing software and media files to reproduce the media data.

Besides, as a technique similar in field to the present invention, there is found "intercommunication system between different TV phones" in Japanese Patent Applications laid open No. HEI8-46723. The system was proposed for the purpose of enabling intercommunication among different types of TV phones, which had not been achievable because of diversity in protocols. In the intercommunication system, n(n−1) pieces of protocol converters are prepared for n types of TV phones, and the converters are selectively used according to DTMF (Dial Tone Multi Frequency) instructions to set up connection.

In the system, however, it is necessary to provide n(n−1) pieces of protocol converters for n types of TV phones. In other words, numbers of protocol converters are required depending on the number of TV phone types. In addition, the system does not respond flexibly to a switch in converters.

SUMMARY OF THE INVENTION

It is therefore an object of the present invention to provide a method, apparatus and system for transmitting moving image data, in which various moving image data of existent media files are efficiently delivered to existent TV cellular phones in reproducible format.

In accordance with the first aspect of the present invention, to achieve the above objects, there is provided a moving image data transmitting system for enabling a cellular phone to reproduce image data produced by an image data processing protocol of a different format, comprising: TV cellular phones having TV phone function for receiving and reproducing transmitted dynamic images; a media file storage for storing media files which are formed in arbitrary format for filing moving images; an interface converter for multiplexing intermediate formatted data to generate the bit stream of voice/image data and sending the bit stream to the TV cellular phones; a media file controller for sending the intermediate formatted data and codec (code/decode) information on the voice/image data to the interface converter; and an intermediate formatted data storage for storing the codec information on the voice/image data from the media file controller and the media files from the media file storage as the intermediate formatted data.

In accordance with the second aspect of the present invention, in the first aspect, the moving image data transmitting system further comprises a TV cellular phone network for interconnecting the TV cellular phones.

In accordance with the third aspect of the present invention, in the second aspect, the moving image data transmitting system further comprises switching units which are connected to the TV cellular phone network and communicate with the TV cellular phones by radio.

In accordance with the fourth aspect of the present invention, there is provided a moving image data transmitting apparatus for enabling a cellular phone to reproduce image data produced by an image data processing protocol of a different format, comprising: a media file storing means for storing media files which are formed in arbitrary format for filing moving images; an interface converting means for multiplexing intermediate formatted data to generate the bit stream of voice/image data and sending the bit stream to TV cellular phones having TV phone function for receiving and reproducing transmitted dynamic images; a media file controlling means for sending the intermediate formatted data and codec (code/decode) information on the voice/image data to the interface converting means; and an intermediate formatted data storing means for storing the codec information on the voice/image data from the media file controlling means and the media files from the media file storing means as the intermediate formatted data.

In accordance with the fifth aspect of the present invention, in the fourth aspect, the intermediate formatted data includes first voice frame data, second voice frame data and image frame data, wherein the first voice frame data precedes the second voice frame data on time axis, and the image frame data is positioned in between the first voice frame data and the second voice frame data.

In accordance with the sixth aspect of the present invention, in the fifth aspect, each of the first voice frame data, second voice frame data and image frame data is provided with an identifier.

In accordance with the seventh aspect of the present invention, there is provided a moving image data transmitting method for enabling a cellular phone having TV phone function for receiving and reproducing transmitted dynamic images to reproduce image data produced by an image data processing protocol of a different format, comprising the steps of: storing media files which are formed in arbitrary format for filing moving images by a media file storing means; multiplexing intermediate formatted data to generate the bit stream of voice/image data and sending the bit stream by an interface converting means; sending the intermediate formatted data and codec (code/decode) information on the voice/image data to the interface converting means by a media file controlling means; and storing the codec information on the voice/image data from the media file controlling means and the media files from the media file storing means as the intermediate formatted data by an intermediate formatted data storing means.

In accordance with the eighth aspect of the present invention, in the seventh aspect, a TV cellular phone network is formed for interconnecting the TV cellular phones.

In accordance with the ninth aspect of the present invention, in the eighth aspect, the intermediate formatted data includes first voice frame data, second voice frame data and image frame data, wherein the first voice frame data precedes the second voice frame data on time axis, and the image frame data is positioned in between the first voice frame data and the second voice frame data.

In accordance with the tenth aspect of the present invention, in the ninth aspect, each of the first voice frame data, second voice frame data and image frame data is provided with an identifier.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
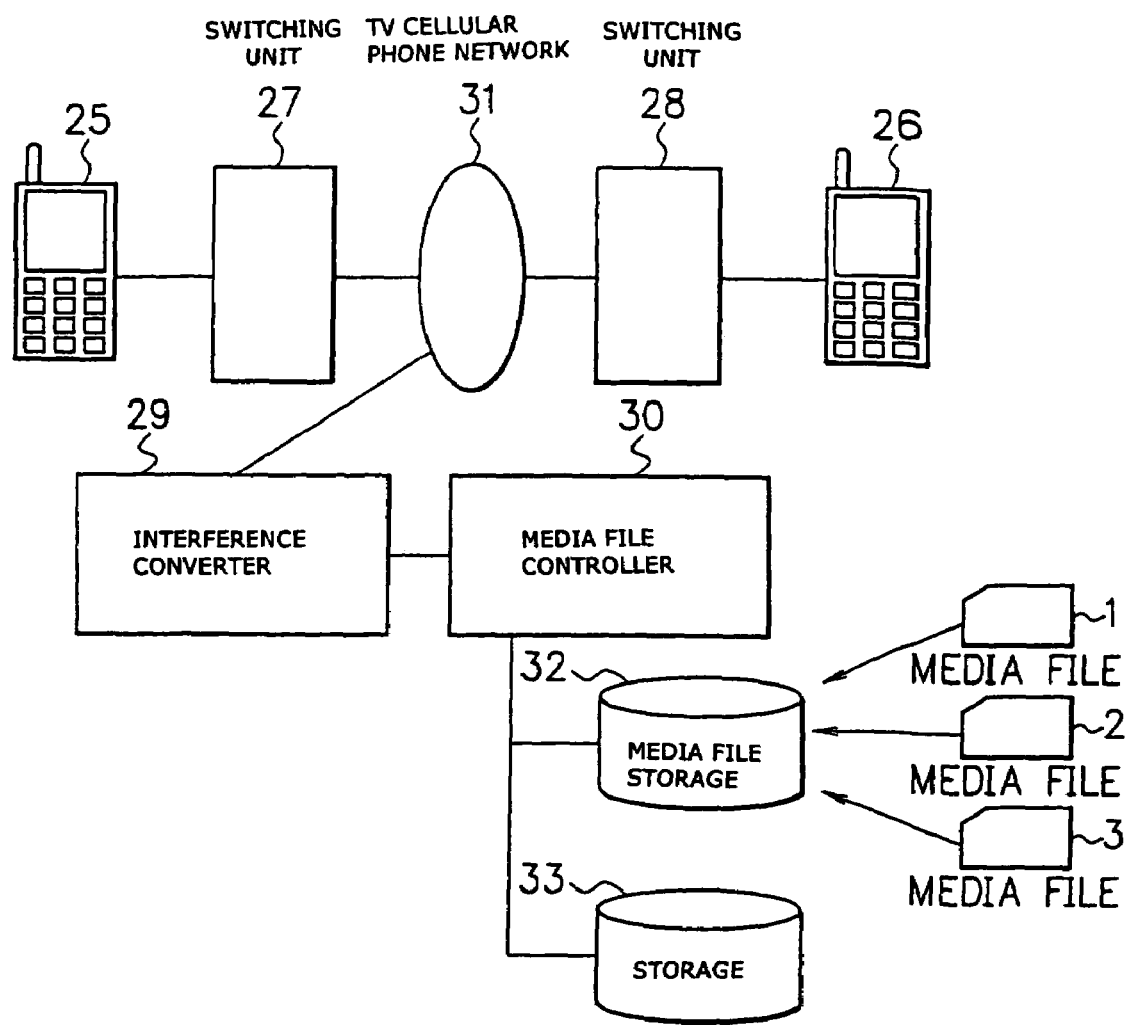
FIG. 1 is a diagram showing the example configuration of a moving image data transmitting system for illustrating an application of apparatus and method for transmitting moving image data according to an embodiment of the present invention.

Referring now to the drawings, a description of a preferred embodiment of the present invention will be given in detail.

FIG. 1 is a diagram showing the configuration of a communication system for transmitting moving image data according an embodiment of the present invention. The component parts of the system will be described below. Referring to FIG. 1, the moving image data transmitting system comprises TV cellular phones 25 and 26; switching units 27 and 28, an interface converter 29, a media file controller 30, a TV cellular phone network 31, a media file storage 32, and a storage 33.

The TV cellular phones 25 and 26 are cellular phones having TV function for reproducing moving images. The respective TV cellular phones 25 and 26 are provided with a protocol control function for controlling H. 223 multiplex protocol and H. 245 communication control protocol in order to realize the TV function.

The H. 223 multiplex protocol is a protocol used for multimedia communication of low bit rate. First, a packet multiplexing system according to the ITU-T Recommendation H. 223 will be explained. Here is an excerpt from "Communication Protocol Dictionary", Ascii Corporation, pp. 517:

The packet multiplexing system H. 223 was developed for GSTN (General Switched Telephone Network) TV phone system, and consists of a Multiplex (MUX) layer for multiplexing and an adaptation (AL) layer for adaptation to a media information stream. The AL layer includes AL 1 for control or data information, AL 2 for voice information and AL 3 for image information, each having a function different from others in error detection, sequence number and retransmission. One of the characteristics of the multiplexing system H. 223 is that the problem of packet switching delay in low-bit rate communication is solved by inserting plural pieces of media information into one MUX packet.

The H. 245 communication control protocol is control messages specified by ITU-T for packet multiplexing. Here is also an excerpt from "Communication Protocol Dictionary", Ascii Corporation, pp. 518–519:

The H. 245 communication control protocol was developed for audio-visual communications, and commonly employed in numbers of systems. The protocol is characterized by its confirming procedure in which each time a transmitter sends a command or instruction to a receiver, the transmitter obtains an acknowledgement signal ACK or NACK from the receiver before sending the next message. While the process is complicated by the confirming procedure, the state transition of the respective terminals is made clear, thus enabling reliable communications.

Additionally, other vocabulary of terms relating to the present invention will be briefly explained.

Here is an excerpt as to the GSTN system H. 324 from "Communication Protocol Dictionary", Ascii Corporation, pp. 521:

General analog telephone networks are called GSTN (General Switched Telephone Network) for short. Accessibility to any point from anyplace in the world is an exclusive characteristic of GSTN. Although proposed channels are of the band range for analog telephones, GSTN can be used as a digital data exchange network up to 28.8 kbps by providing a terminal with a modem. The audio-visual communication system using GSTN is defined by the ITU-T Recommendation H. 324.

Here is an excerpt as to MPEG from "Communication Protocol Dictionary", Ascii Corporation, pp. 531:

MPEG (Moving Picture Expert Group) is originally the nickname of the group for standardizing moving image/voice compression or coding in SC29, and comes into widespread use as a term indicating international standard ISO/IEC 11172 and ISO/IEC 13818 specified by the group. The former is called MPEG-1, and the latter is called MPEG-2, both of which are well-known standards in multimedia.

Each of the switching units 27 and 28 has the functions of receiving a media file reproduction instruction and a moving image storage instruction from the TV cellular phone 25 or 26 as well as sending the media file reproduction instruction and the moving image storage instruction to the media file controller 30. In addition, the switching units 27 and 28 are provided with a function for transmitting/receiving call information exchanged between the TV cellular phone 25 or 26 and the interface converter 29.

The interface converter 29 has the functions of controlling the H.223 multiplex protocol and H. 245 communication control protocol, receiving the bit stream of voice/image data from the TV cellular phone 25 or 26 to analyze and separate the bit stream, multiplexing and generating the bit stream of voice/image data to send the bit stream to the TV cellular phone 25 or 26, relaying intermediate formatted data to the media file controller 30, receiving the intermediate formatted data from the media file controller 30 to analyze and separate the intermediate formatted data, and generating media file information sent to the media file controller 30.

The media file controller 30 has the functions of receiving a media file reproduction instruction and a moving image storage instruction from the TV cellular phone 25 or 26, sending a storage start instruction to the interface converter 29, generating the intermediate formatted data and codec (code/decode) information on the voice/image data to send them to the interface converter 29, receiving the intermediate formatted data and codec information on the voice/image data from the interface converter 29, sending the intermediate formatted data and codec information on the voice/image data to the storage 33, and receiving media files from the media file storage 32.

The TV cellular phone network 31 is a network for interconnecting the TV cellular phones 25 and 26.

The media file storage 32 has the functions of storing the media files 1 to 3, receiving a media file receive instruction from the media file controller 30, and sending the media file instructed to receive to the media file controller 30.

The storage 33 has the functions of receiving the intermediate formatted data and codec information on the voice/image data as well as the storage start instruction from the media file controller 30, and receiving files from the media file controller 30 to store the files.

Figure 2:
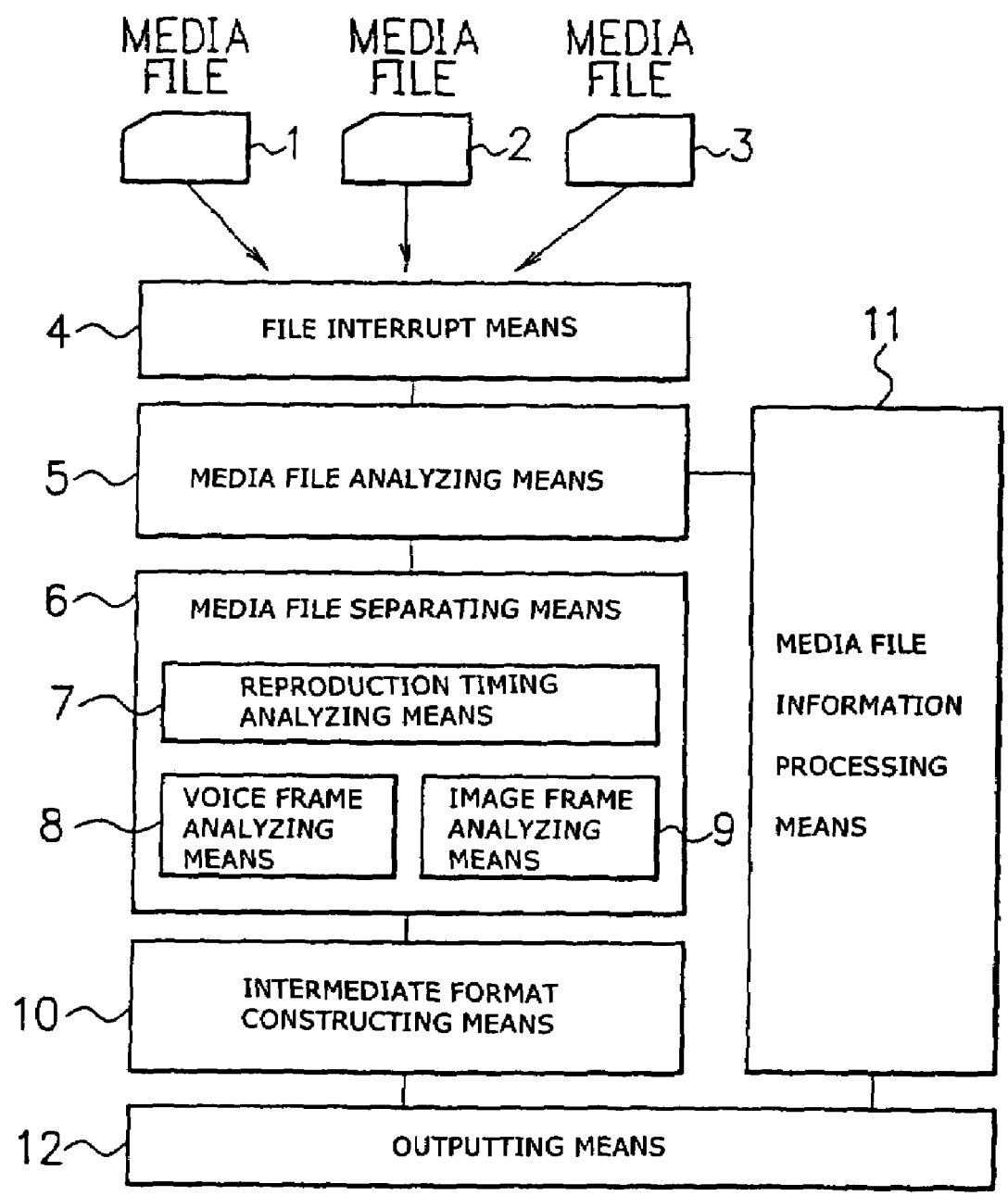
FIG. 2 is a block diagram showing the example configuration of a media file controller depicted in FIG. 1.

In the following, a detailed description will be given of the media file controller 30 with reference to FIG. 2. FIG. 2 is a block diagram showing the example configuration of the media file controller 30. The media file controller 30 includes a file inputting means 4 for inputting the media files 1 to 3, a media file analyzing means 5, a media file separating means 6, an intermediate format constructing means 10, a media file information processing means 11, and an outputting means 12.

Incidentally, the media files 1 to 3 are files formed in arbitrary format for filing moving images.

The file inputting means 4 is a processing block having the functions of identifying the type of each input media file, and sending the media file to the media file analyzing means 5 corresponding to the type of the media file.

The media file analyzing means 5 is a processing block having the functions of analyzing the header information of the media file received from the file inputting means 4, sending media data included in the analyzed media file to the media file separating means 6, extracting voice codec information and image codec information which constitute the media file, and sending the voice codec information and image codec information to the media file information processing means 11.

The media file separating means 6 is a processing block provided with a reproduction timing analyzing means 7, a voice frame analyzing means 8, and an image frame analyzing means 9.

The reproduction timing analyzing means 7 has the functions of analyzing the received media file, extracting voice frames and image frames on the same time axis with respect to each reproduced image, controlling and determining the order in which the voice frames and image frames are output, extracting each of the frames, and sending the extracted voice frame and image frame to the voice frame analyzing means 8 and image frame analyzing means 9, respectively.

The voice frame analyzing means 8 has the functions of analyzing the received voice frame, adjusting the frame to the format corresponding to the voice/image bit stream according to H. 324, adding an identifier for indicating voice to each of the voice frames, maintaining the order for intermediate format determined by the reproduction timing analyzing means 7, and sending the voice frames to the intermediate format constructing means 10.

The image frame analyzing means 9 has the functions of analyzing the received image frames, adjusting the frames to the format corresponding to the voice/image bit stream according to H. 324, adding an identifier for indicating image to each of the image frames, maintaining the order for intermediate format determined by the reproduction timing analyzing means 7, and sending the image frames to the intermediate format constructing means 10.

The intermediate format constructing means 10 is a processing block having the functions of receiving the adjusted voice frames and image frames each having the identifier from the voice frame analyzing means 8 and image frame analyzing means 9, respectively, and generating the intermediate formatted data based on the order of frames determined by the reproduction timing analyzing means 7.

The media file information processing means 11 is a processing block having the functions of converting the extracted voice codec information and image codec information received from the media file analyzing means 5 into a format compatible with the interface between the transmitter and receiver, and sending the generated interface format to the outputting means 12.

The outputting means 12 is a processing block having the function of sending the data to the receiver.

Figure 3:
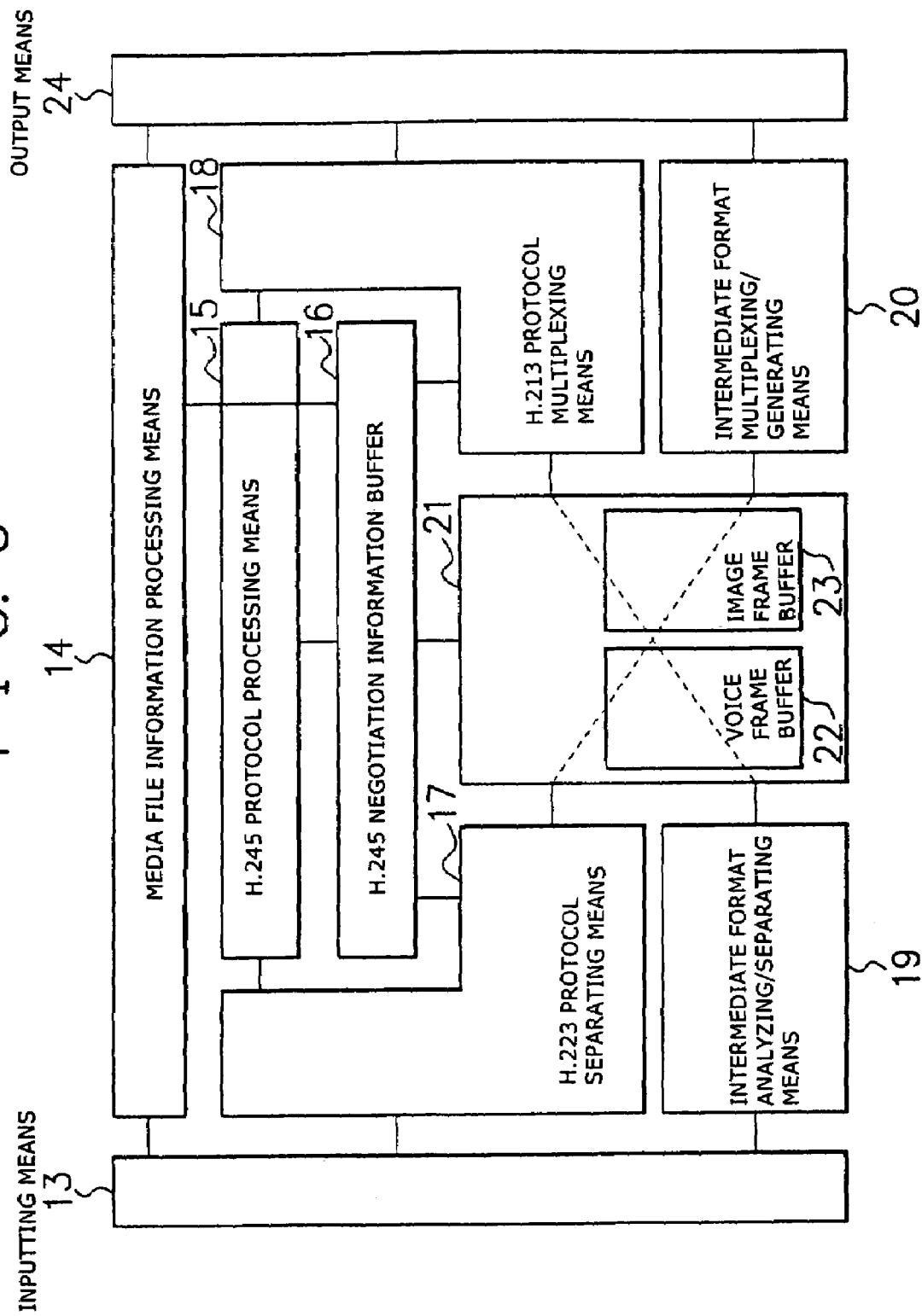
FIG. 3 is a block diagram showing the example configuration of an interface converter depicted in FIG. 1.

Next, the interface converter 29 will be described in detail. FIG. 3 is a block diagram showing the example configuration of the interface converter 29. Referring to FIG. 3, the interface converter 29 includes an inputting means 13, a media file information processing means 14, an H. 245 protocol processing means 15, an H. 245 negotiation information buffer 16, an H. 223 protocol separating means 17, an H. 223 protocol multiplexing means 18, an intermediate format analyzing/separating means 19, an intermediate format multiplexing/generating means 20, an output timing means 21, and an outputting means 24.

The inputting means 13 is a processing block having the function of analyzing received data and allocating the data to the media file information processing means 14, H. 223 protocol separating means 17, and intermediate format analyzing/separating means 19.

The media file information processing means 14 is a processing block having the function of analyzing media file information generated from the voice/image codec information in the media file when generating the intermediate formatted data, and storing the media file information in the H. 245 negotiation information buffer 16.

The H. 245 protocol processing means 15 is a processing block having the function of analyzing/controlling H. 245 data received from the H. 223 protocol separating means 17 based on the H. 245 communication control program, and making a response to the H. 223 protocol multiplexing means 18.

The H. 245 negotiation information buffer 16 is a memory for storing information obtained by negotiations conducted by the H. 245 protocol processing means 15 based on the H. 245 communication control program and the media file information.

The H. 223 protocol separating means 17 is a processing block having the function of analyzing and separating the data received from the inputting means 13 based on the H. 223 multiplex protocol, and allocating the separated data to the H. 245 protocol processing means 15 and output timing means 21.

The H. 223 protocol multiplexing means 18 is a processing block having the function of multiplexing the data received from the H. 245 protocol processing means 15 and output timing means 21 based on the H. 223 multiplex protocol, and sending the multiplexed data to the outputting means 24.

The intermediate format analyzing/separating means 19 is a processing block having the function of analyzing the intermediate formatted data generated from the media file to perform separative control using the identifier, controlling the order of the separated voice frames and image frames, and sending the frames to the output timing means 21.

The intermediate format multiplexing/generating means 20 is a processing block having the function of receiving the voice frames and image frames that have been extracted from the voice/image bit stream, respectively, and provided with the identifiers, and arranging the frames in order of receipt in the intermediate format to generate the intermediate formatted data.

The output timing means 21 is provided with a voice frame buffer 22 and an image frame buffer 23. The output timing means 21 is a processing block having the function of controlling the order in which the voice frames and image frames extracted from the intermediate formatted data are output when receiving the frames, storing the voice frames and image frames in the voice frame buffer 22 and image frame buffer 23, respectively, and reading the frames out of the frame buffers 22 and 23 to send the frames to the H. 223 protocol multiplexing means 18. Besides, the output timing means 21 also executes the process of controlling the order in which the voice frames and image frames extracted from the voice/image bit stream are output when receiving the frames, storing the voice frames and image frames in the voice frame buffer 22 and image frame buffer 23, respectively, and reading the frames out of the frame buffers 22 and 23 to send the frames to the intermediate format multiplexing/generating means 20.

The voice frame buffer 22 is a memory for temporarily storing the voice frames that form the voice/image bit stream or intermediate formatted data.

The image frame buffer 23 is a memory for temporarily storing the image frames that form the voice/image bit stream or intermediate formatted data.

The outputting means 24 is a processing block having the function of sending the data received from the media file information processing means 14, H. 223 protocol multiplexing means 18, and intermediate format multiplexing/generating means 20 to the receiver.

On the occasion when the intermediate formatted data is created at the media file controller 30, first the media file 1, 2 or 3 in arbitrary format is input to the file inputting means 4. The file inputting means 4 then sends the media file to the media file analyzing means 5 corresponding to the type of the input media file. Having received the media file, the media file analyzing means 5 analyzes the header information thereof, and sends media data included in the analyzed media file to the media file separating means 6. In addition, the media file analyzing means 5 extracts voice codec information and image codec information which constitute the media file to create media file information, and sends the media file information to the media file information processing means 11. Subsequently, the media file information processing means 11 converts the media file information into the format of interface with the receiver of intermediate formatted data, and sends the formatted media file information to the receiver via the outputting means 12.

Besides, the reproduction timing analyzing means 7 analyzes the received media data, and arranges the voice frames and image frames according to the order when they are on the same time axis. With this, the media file separating means 6 determines the order in which the voice frames and image frames are arranged in the intermediate formatted data. The voice frames and image frames are analyzed by the voice frame analyzing means 8 and image frame analyzing means 9, respectively.

The voice frame analyzing means 8 and image frame analyzing means 9 adjust the frames to the format corresponding to the voice/image bit stream according to H. 324, and add an identifier for indicating voice or image to each of the frames. After that, the voice frame analyzing means 8 and image frame analyzing means 9 send the frames to the intermediate format constructing means 10.

Having received the adjusted voice frames and image frames each having the identifier from the voice frame analyzing means 8 and image frame analyzing means 9, the intermediate format constructing means 10 reassembles the frames into the intermediate formatted data based on the order of frames determined by the reproduction timing analyzing means 7. Thus, the intermediate formatted data is generated and sent to the receiver via the outputting means 12.

In the case of creating the voice/image bit stream to an H. 324 terminal (cellular phone) by using the intermediate formatted data, the media file information processing means 14 receives the media file information including the voice/image codec information through the inputting means 13. The media file information processing means 14 stores the media file information in the H. 245 negotiation information buffer 16 together with negotiation information according to the H. 245 communication control protocol obtained by the negotiations at the start of communication.

On the other hand, the intermediate format analyzing/separating means 19 receives the intermediate formatted data through the inputting means 13. The intermediate format analyzing/separating means 19 identifies the respective voice frames and image frames in the intermediate formatted data by their identifiers to separate them in order of arrangement, and sends the frames to the output timing means 21.

The output timing means 21 controls the order to output the voice frames and image frames extracted from the intermediate formatted data when receiving the frames so as not to damage the synchronization of voice data and image data. Then, the output timing means 21 stores the voice frames and image frames in the voice frame buffer 22 and image frame buffer 23, respectively.

The voice frames are read out of the voice frame buffer 22 one by one according to voice output timing calculated from the negotiation information stored in the H. 245 negotiation information buffer 16, the transmission rate of transmission line, and voice codec information included in the media file information, and sent to the H. 223 protocol multiplexing means 18.

The H. 223 protocol multiplexing means 18 multiplexes the voice frames received from output timing means 21 based on the H. 223 multiplex protocol, and generates the voice bit stream.

On the other hand, all the image frames placed between a couple of voice frames are read out of the image frame buffer 23 under the order control so as not to damage the synchronization of voice data and image data, and sent to the H. 223 protocol multiplexing means 18 during a period after transmitting first one of the couple of voice frames until the timing for transmitting another.

The H. 223 protocol multiplexing means 18 multiplexes the voice frames based on the H. 223 multiplex protocol, and generates the image bit stream.

In the case of creating the intermediate formatted data by using the voice/image bit stream from an H. 324 terminal, the media file information processing means 14 generates the media file information based on the negotiation information in the H. 245 negotiation information buffer 16, which was obtained through the negotiations conducted by the H. 245 protocol processing means 15. The media file information is sent to the receiver via the outputting means 24.

Besides, the H. 223 protocol separating means 17 receives the voice/image bit stream through the inputting means 13. Subsequently, the H. 223 protocol separating means 17 carries out separative processing for the received data in order of receipt based on the H. 223 multiplex protocol, and sends the voice frames and image frames to the output timing means 21 according to the order in which they have been extracted.

The output timing means 21 performs order control when receiving the frames so as not to damage the synchronization of voice data and image data, and adding an identifier for indicating voice or image to each of the voice frames and image frames. Then, the output timing means 21 sends the frames to the intermediate format multiplexing/generating means 20.

Having received the voice frames and image frames, the intermediate format multiplexing/generating means 20 reassembles the frames in order of receipt according to the intermediate format to produce the intermediate formatted data. The intermediate formatted data is sent to the outputting means 24.

In the following, a mode of operation of the present invention will be described.

When the TV cellular phone 25 starts communication with the interface converter 29 via the switching unit 27 and TV cellular phone network 31, negotiations on the communication based on the H. 245 communication control protocol start between the TV cellular phone 25 and interface converter 29.

In the interface converter 29, the H. 223 protocol separating means 17 receives information about the negotiations via the inputting means 13, and separates multiplexed data based on the H. 223 multiplex protocol to send the separated data to the H. 245 protocol processing means 15.

The H. 245 protocol processing means 15 controls transmission-reception of the negotiation information to store or send the information. The negotiation information about the established communication is stored in the H. 245 negotiation information buffer 16, or sent to the H. 223 protocol multiplexing means 18. Having received the negotiation information, the H. 223 protocol multiplexing means 18 multiplexes it, and sends the multiplexed data to the outside via the outputting means 24.

Additionally, the TV cellular phone 25 sends a media file reproduction instruction for designating the media file to be reproduced to the media file controller 30 via the switching unit 27, the interface converter 29 and TV cellular phone network 31.

Having received the media file reproduction instruction, the media file controller 30 fetches the designated media file from the media file storage 32. Incidentally, the media file storage 32 stores the media files 1, 2 and 3, in arbitrary format, that hold moving images as media images.

In the media file controller 30, when the media file fetched from the media file storage 32 is input in the file inputting means 4, the file inputting means 4 sends the media file to the media file analyzing means 5 corresponding to the type of the media file. Subsequently, the media file analyzing means 5 analyzes header information, etc. of the media file to send the analyzed media data to the media file separating means 6. The media file analyzing means 5 also obtains codec information for voice or image data in the media file to generate media file information. The media file information is sent to the media file information processing means 11, and then sent to the interface converter 29 via the outputting means 12.

In the interface converter 29, the media file information processing means 14 receives the media file information including the voice/image codec information via the inputting means 13. The media file information is stored in the H. 245 negotiation information buffer 16 together with the negotiation information based on the H. 245 communication control protocol that was obtained at the start of the communication.

In the case of generating the intermediate formatted data, the media file separating means 6 of the media file controller 30 receives the media data. Subsequently, the reproduction timing analyzing means 7 analyzes the media data, and arranges the voice frames and image frames according to the order when they are on the same time axis. Thus, the media file separating means 6 determines the order in which the voice frames and image frames are placed in the intermediate formatted data. The voice frames and image frames are analyzed by the voice frame analyzing means 8 and image frame analyzing means 9, respectively, and adjusted so as to correspond to the voice/image bit stream according to H. 324. After that, the voice frame analyzing means 8 and image frame analyzing means 9 add an identifier for indicating voice or image to each of the frames and send the frames to the intermediate format constructing means 10.

Having received the adjusted voice frames and image frames each having the identifier from the voice frame analyzing means 8 and image frame analyzing means 9, the intermediate format constructing means 10 reassembles the frames into the intermediate formatted data based on the order of frames determined by the reproduction timing analyzing means 7. The generated intermediate formatted data is sent to the interface converter 29 via the outputting means 12.

In the case of generating the voice/image bit stream to an H. 324 terminal by using the intermediate formatted data received from the media file controller 30, the intermediate format analyzing/separating means 19 of the interface converter 29 receives the intermediate formatted data through the inputting means 13. Subsequently, the intermediate format analyzing/separating means 19 identifies the respective voice and image frames included in the intermediate formatted data by their identifiers, and separates each of the frames in order of arrangement. The separated voice and image frames are sent to the output timing means 21.

Having received the separated frames, the output timing means 21 performs order control for the voice and image frames so that the synchronization of voice data and image data is not to be damaged at the receiver. Then, the voice frames and image frames are stored in the voice frame buffer 22 and image frame buffer 23.

The voice frames stored in the voice frame buffer 22 are read out one by one according to voice output timing calculated from the negotiation information stored in the H. 245 negotiation information buffer 16, the transmission rate of transmission line, and voice codec information included in the media file information, and sent to the H. 223 protocol multiplexing means 18 to produce the voice bit stream multiplexed based on the H. 223 multiplex protocol.

As to the image frames stored in the image frame buffer 23, all the image frames placed between a couple of voice frames are read out under the order control so as not to damage the synchronization of voice data and image data. Subsequently, the image frames are sent to the H. 223 protocol multiplexing means 18 during a period after transmitting first one of the voice frames until the timing for transmitting another to produce the image bit stream multiplexed based on the H. 223 multiplex protocol.

After that, the H. 223 protocol multiplexing means 18 sends the voice/image bit stream to the outputting means 24 so that the bit stream is transmitted to the TV cellular phone 25 via the switching unit 27 and TV cellular phone network 31.

For storing moving images, the TV cellular phone 25 first sends a moving image storage instruction to the media file controller 30 via the switching unit 27, the interface converter 29 and TV cellular phone network 31. Subsequently, the media file controller 30 issues storage start instructions to the interface converter 29 and storage 33 at a time. Having received the storage start instruction, the storage 33 keeps specific information about the user of the TV cellular phone 25 and prepares for storing moving images.

When the interface converter 29 receives the storage start instruction from the media file controller 30, negotiations on the communication based on the H. 245 communication control protocol start between the TV cellular phone 25 and interface converter 29 via the switching unit 27 and TV cellular phone network 31.

After the negotiations are closed, the media file information is generated using the negotiation information that was received at the H. 245 protocol processing means 15 and stored in the H. 245 negotiation information buffer 16. The generated media file is sent to the media file controller 30 via the outputting means 24.

When the H. 223 protocol separating means 17 of the interface converter 29 receives the voice/image bit stream through the inputting means 13, the H. 223 protocol separating means 17 carries out separative processing for the received data in order of receipt based on the H. 223 multiplex protocol, and sends the voice frames and image frames to the output timing means 21 according to the order in which they have been separated.

The output timing means 21 performs order control of the separated voice frames and image frames so as not to damage the synchronization of voice data and image data, and adds an identifier for indicating voice or image to each of the frames. Then, the output timing means 21 sends the frames to the intermediate format multiplexing/generating means 20.

Having received the voice frames and image frames from the output timing means 21, the intermediate format multiplexing/generating means 20 reassemble the frames in order of receipt according to the intermediate format to produce the intermediate formatted data. The intermediate formatted data is sent to the outputting means 24.

The outputting means 24 sends the intermediate formatted data to the media file controller 30.

The intermediate formatted data generated by the interface converter 29 and voice/image codec information, which have been received by the media file controller 30, are sent to the storage 33. The storage 33 stores the intermediate formatted data and media file information in relation to the user information.

Figure 4:
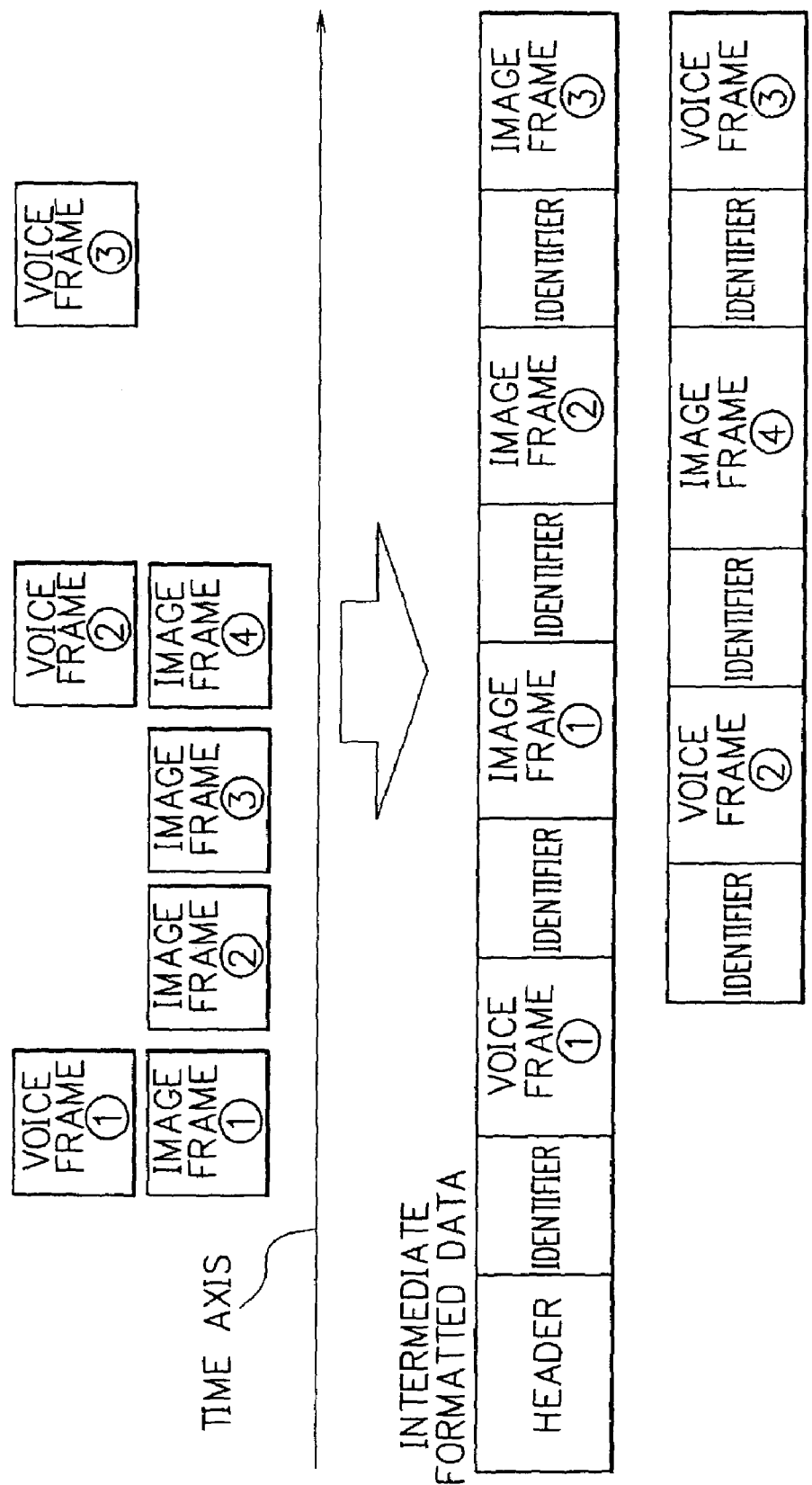
FIG. 4 is a conceptual diagram showing the configuration of intermediate formatted data for explaining data processing.

In the following, a description will be given of the whole operation for transmitting moving images according to an embodiment of the present invention with reference to FIGS. 4 to 13. FIG. 4 is a schematic diagram for explaining the procedure for forming the intermediate formatted data. FIGS. 5 to 13 are flowcharts for explaining individual operations of respective units as processes 1 to 7.

In FIG. 4, voice frames ① to ③ and image frames ① to ④ above the time axis T are arranged in conventional transmitting order, while voice frames ① to ③ and image frames ① to ④ below the time axis T are arranged in intermediate format of the present invention.

Referring to FIG. 4, in the conventional transmitting order, image frames ① to ③ are reassembled in parallel with voice frames ① to ③. On the other hand, in the intermediate format of the present invention, image frames ① to ③ each having an identifier are placed between voice frames ① to ② and identifiers thereof. Similarly, image frame ④ and its identifier are placed between voice frames ② to ③ and identifiers thereof. The intermediate formatted data is provided with a header at the forefront as an ID of whole data. First, a description will be given of the procedure for sending the produced intermediate formatted data to the TV cellular phone 25 or 26.

Figure 5:
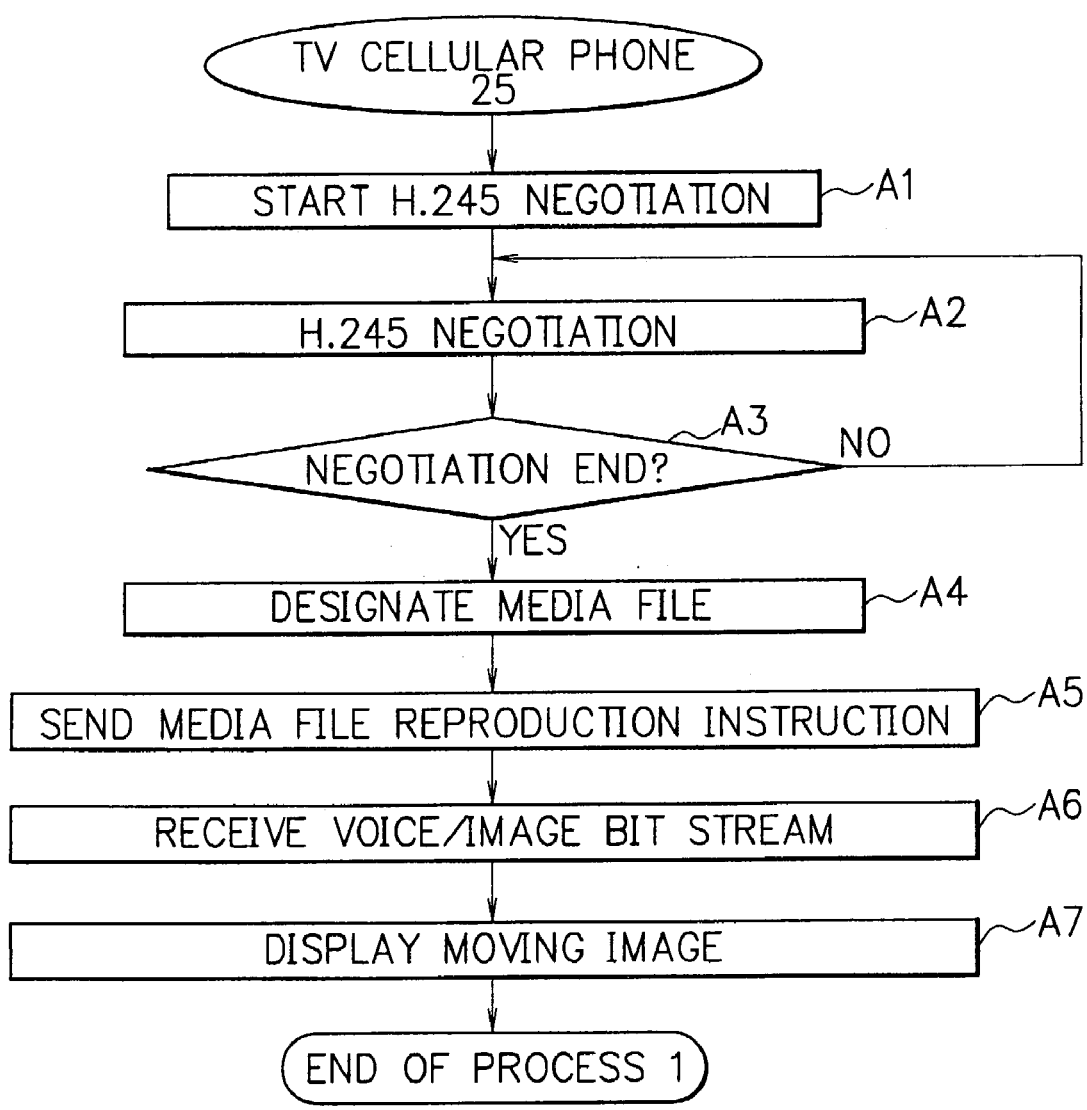
FIG. 5 is a flowchart showing the example operation of process 1 at a TV cellular phone.
Figure 7:
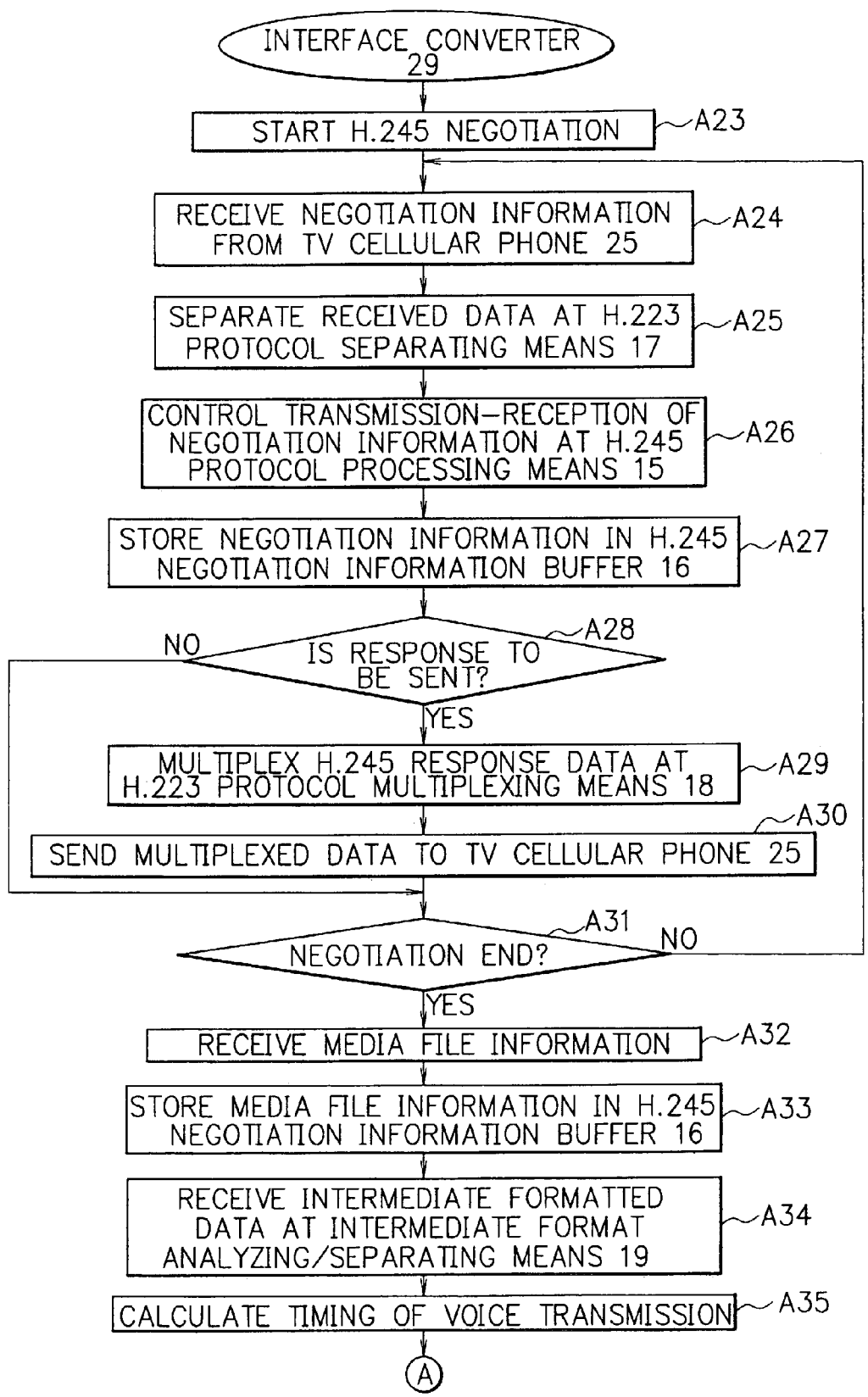
FIG. 7 is a flowchart showing the early part of the example operation of process 3 at the interface converter.

When the TV cellular phone 25 starts communication with the interface converter 29 via the switching unit 27 and TV cellular phone network 31, negotiations on the communication based on the H. 245 communication control protocol start between the TV cellular phone 25 and interface converter 29 (step A1/FIG. 5, step A23/FIG. 7). In the interface converter 29, the H. 223 protocol separating means 17 receives information about the negotiations via the inputting means 13 (step A24/FIG. 7), and separates multiplexed data based on the H. 223 multiplex protocol to send the separated data to the H. 245 protocol processing means 15 (step A25/FIG. 7).

The H. 245 protocol processing means 15 controls transmission-reception of the negotiation information to store or send the information (step A26/FIG. 7). The negotiation information about the established communication is stored in the H. 245 negotiation information buffer 16 (step A27/FIG. 7), or sent to the H. 223 protocol multiplexing means 18 (step A28/FIG. 7). Having received the negotiation information, the H. 223 protocol multiplexing means 18 multiplexes it (step A29/FIG. 7), and sends the multiplexed data to the TV cellular phone 25 via the outputting means 24 (step A30/FIG. 7).

On completion of the negotiations (step A3/FIG. 5, step A31/FIG. 7), the TV cellular phone 25 sends a media file reproduction instruction for designating the media file to be reproduced to the media file controller 30 via the switching unit 27, the interface converter 29 and TV cellular phone network 31 (steps A4 and A5/FIG. 5).

Figure 6:
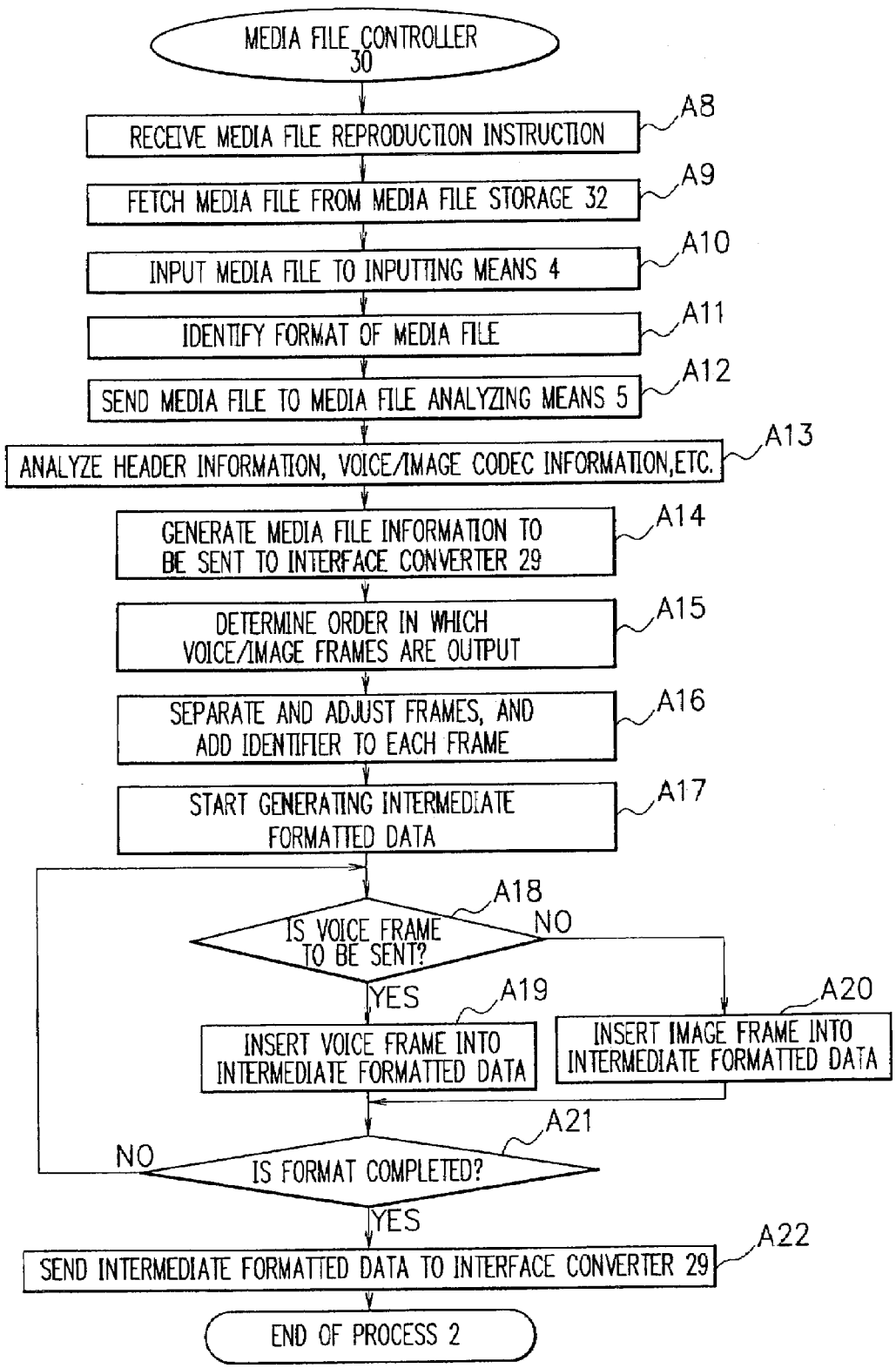
FIG. 6 is a flowchart showing the example operation of process 2 at the media file controller.

Having received the media file reproduction instruction (step A8/FIG. 6), the media file controller 30 fetches the designated media file from the media file storage 32 (step A9/FIG. 6).

In the media file controller 30, when the media file fetched from the media file storage 32 is input in the file inputting means 4 (step A10/FIG. 6), the file inputting means 4 sends the media file to the media file analyzing means 5 corresponding to the type of the media file (steps A11 and A12/FIG. 6). Subsequently, the media file analyzing means 5 analyzes header information, etc. of the media file to send the analyzed media data to the media file separating means 6 (step A13/FIG. 6).

The media file analyzing means 5 also obtains codec information for voice or image data in the media file to generate media file information. The media file information is sent to the media file information processing means 11, and then sent to the interface converter 29 via the outputting means 12 (step A14/FIG. 6).

In the interface converter 29, the media file information processing means 14 receives the media file information including the voice/image codec information via the inputting means 13 (step A32/FIG. 7). The media file information is stored in the H. 245 negotiation information buffer 16 together with the negotiation information based on the H. 245 communication control protocol that was obtained at the start of the communication (step A33/FIG. 7).

When generating the intermediate formatted data, the media file separating means 6 of the media file controller 30 receives the media data. Subsequently, the reproduction timing analyzing means 7 analyzes the media data, and arranges the voice frames and image frames according to the order when they are on the same time axis. Thus, the media file separating means 6 determines the order in which the voice frames and image frames are placed in the intermediate format (step A15/FIG. 6).

The voice frames and image frames are analyzed by the voice frame analyzing means 8 and image frame analyzing means 9, respectively, and adjusted so as to correspond to the voice/image bit stream according to H. 324. After that, the voice frame analyzing means 8 and image frame analyzing means 9 add an identifier for indicating voice or image to each of the frames and send the frames to the intermediate format constructing means 10 (step A16/FIG. 6).

Having received the adjusted voice frames and image frames each having the identifier from the voice frame analyzing means 8 and image frame analyzing means 9, the intermediate format constructing means 10 reassembles the frames into the intermediate formatted data based on the order of frames determined by the reproduction timing analyzing means 7 (steps A18 to A21/FIG. 6). The generated intermediate formatted data is sent to the interface converter 29 via the outputting means 12 (step A22/FIG. 6), and process 2 is completed.

When the interface converter 29 generates the voice/image bit stream to an H. 324 terminal by using the intermediate formatted data received from the media file controller 30, the intermediate format analyzing/separating means 19 receives the intermediate formatted data through the inputting means 13 (step A34/FIG. 7). Subsequently, the voice output timing is calculated from the negotiation information stored in the H. 245 negotiation information buffer 16, the transmission rate of transmission line, and voice codec information included in the media file information (step A35/FIG. 7).

Figure 8:
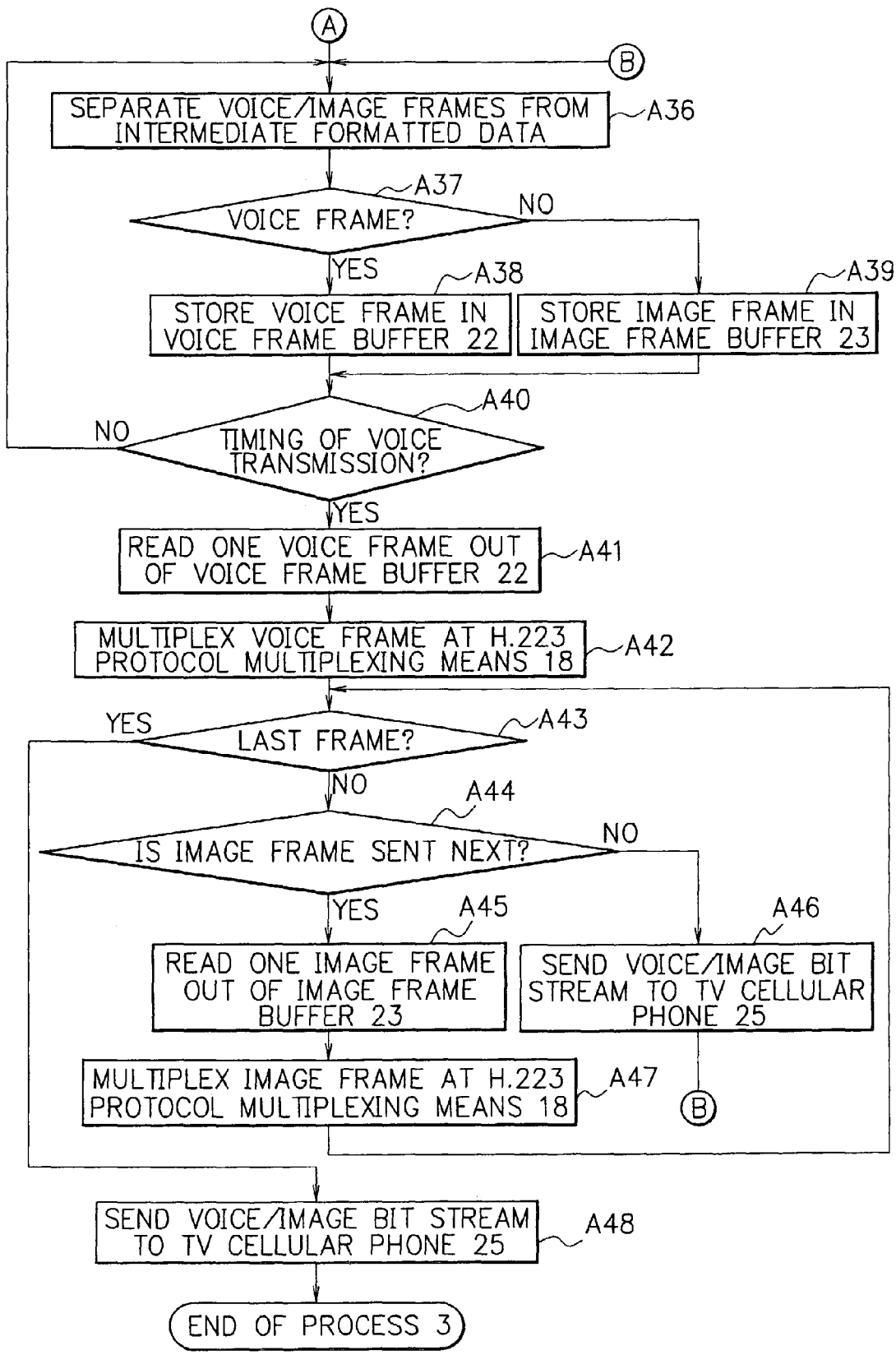
FIG. 8 is a flowchart showing the latter part of the example operation of process 3 at the interface converter.

Having received the intermediate formatted data, the intermediate format analyzing/separating means 19 identifies each voice/image frames included in the intermediate formatted data, and separates the frames in order of arrangement to send them to the output timing means 21 (step A36/FIG. 8). The output timing means 21 performs order control of the voice frames and image frames separated from the intermediate formatted data so as not to damage the synchronization of voice data and image data, and thereby storing the frames in the voice frame buffer 22 or image frame buffer 23 (steps A38 and A39/FIG. 8).

The voice frames stored in the voice frame buffer 22 are read out one by one according to the calculated voice output timing (steps A40 and A41/FIG. 8), and sent to the H. 223 protocol multiplexing means 18 to produce the voice bit stream multiplexed based on the H. 223 multiplex protocol (step A42/FIG. 8).

As to the image frames stored in the image frame buffer 23, all the image frames arranged between a couple of voice frames are read out under the order control so as not to damage the synchronization of voice data and image data (steps A44 and A45/FIG. 8). Then, the image frames are sent to the H. 223 protocol multiplexing means 18 during a period after transmitting first one of the couple of voice frames until the timing for transmitting another to produce the image bit stream multiplexed based on the H. 223 multiplex protocol (step A47/FIG. 8).

After that, the H. 223 protocol multiplexing means 18 sends the voice/image bit stream to the outputting means 24 so that the bit stream is transmitted to the TV cellular phone 25 via the switching unit 27 and TV cellular phone network 31 (steps A46 and A48/FIG. 8), and process 3 is completed.

The TV cellular phone 25 receives the voice/image bit stream, and displays moving images (steps A6 and A7/FIG. 5), thereby completing process 1.

Figure 9:
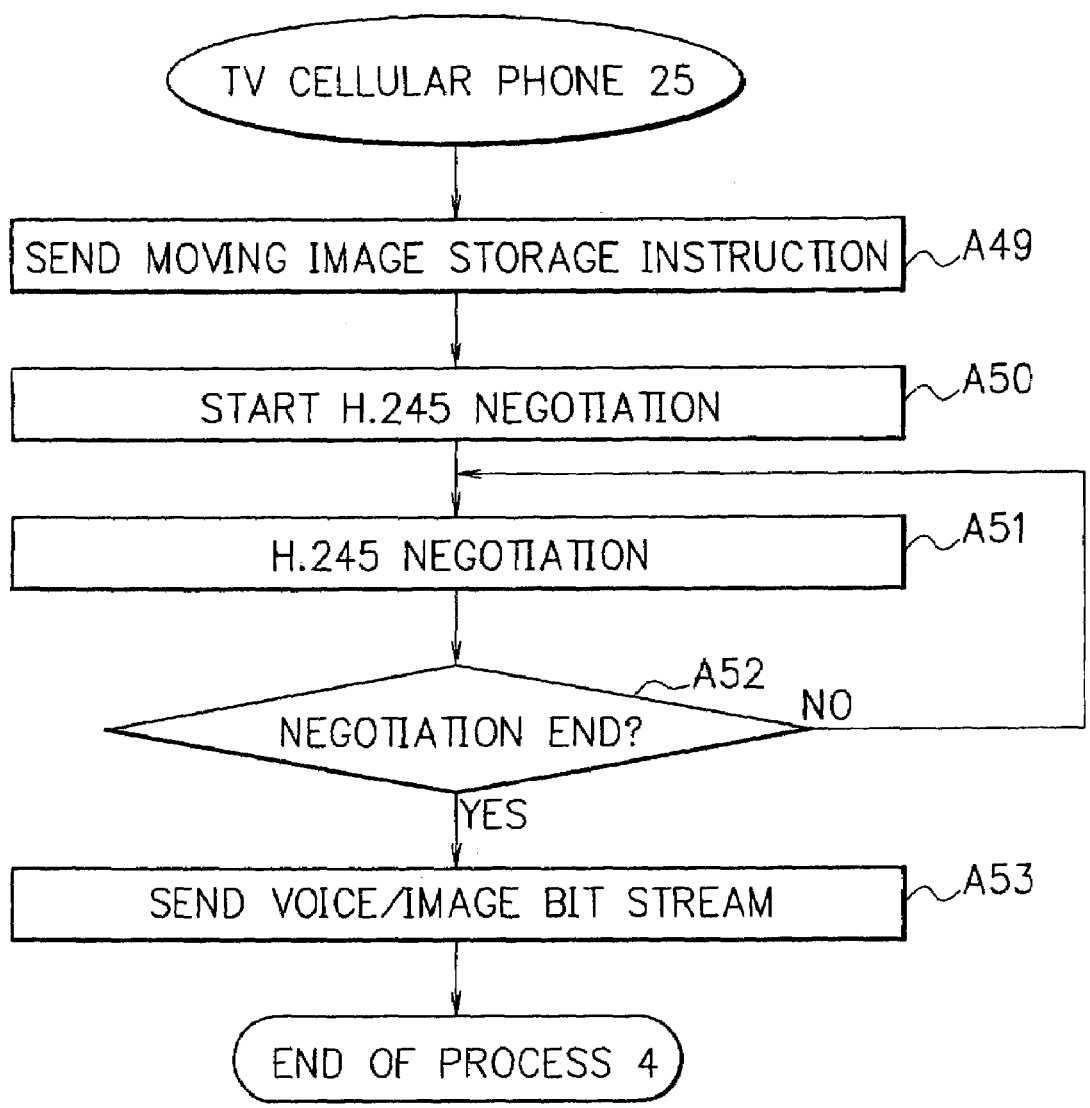
FIG. 9 is a flowchart showing the example operation of process 4 at the TV cellular phone.

When storing moving images, the TV cellular phone 25 sends a moving image storage instruction to the media file controller 30 via the switching unit 27, the interface converter 29 and TV cellular phone network 31 (step A49/FIG. 9). Having received the moving image storage instruction, the media file controller 30 issues storage start instructions to the interface converter 29 and storage 33 at a time (steps A59 to A61/FIG. 11).

Figure 10:
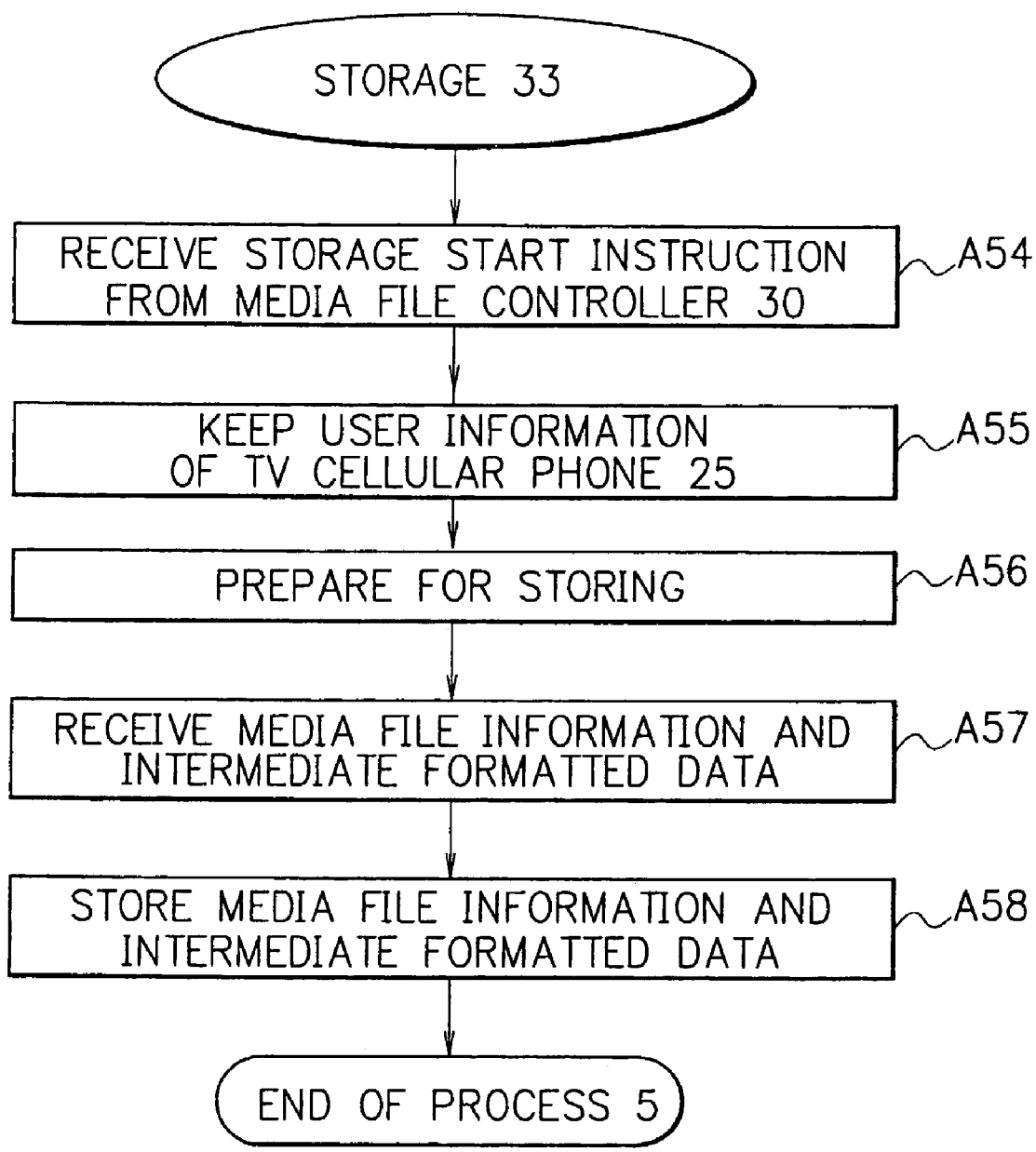
FIG. 10 is a flowchart showing the example operation of process 5 at a storage.
Figure 11:
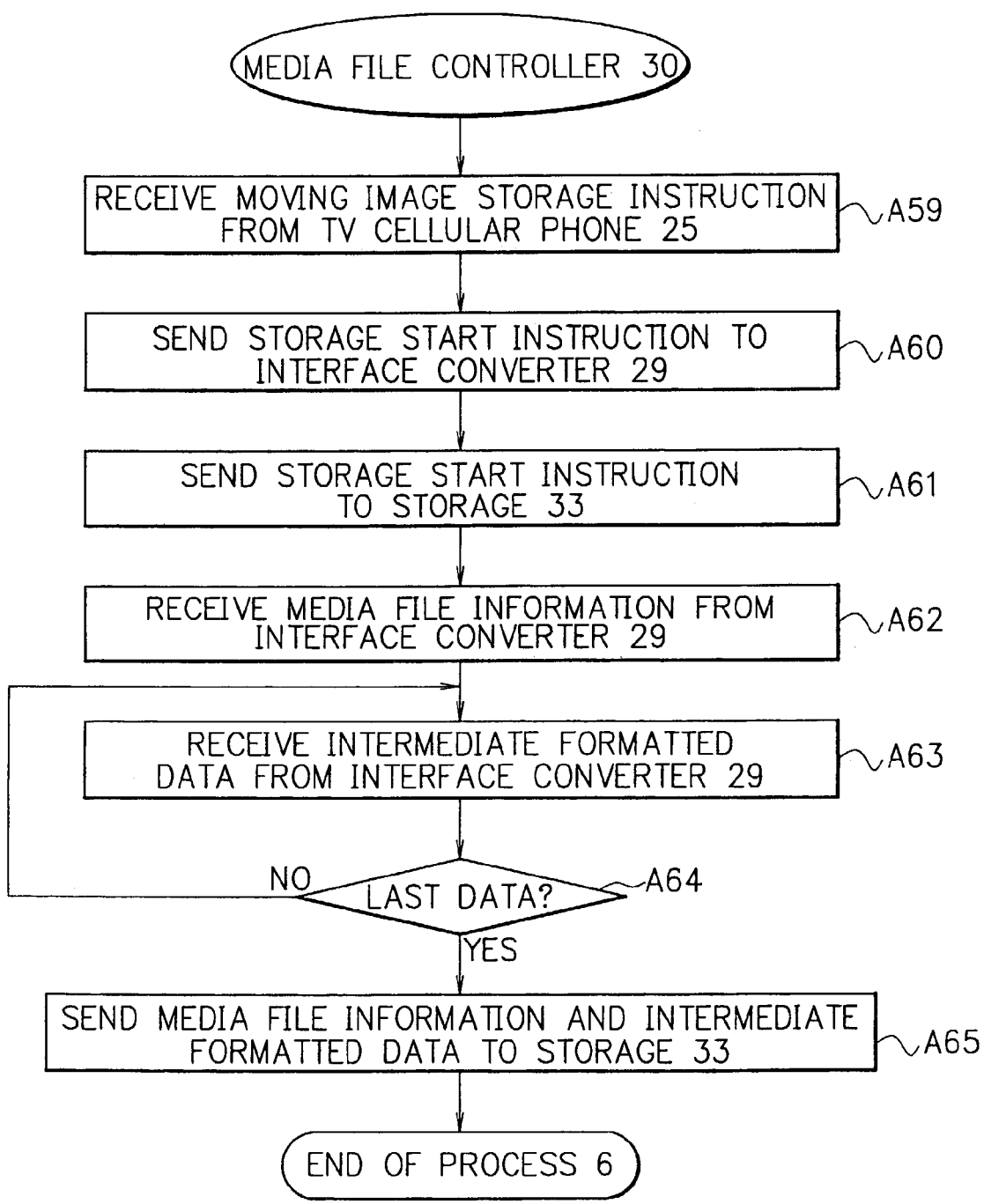
FIG. 11 is a flowchart showing the example operation of process 6 at the media file controller.

On the receipt of the storage start instruction (step A54/FIG. 10), the storage 33 keeps specific information about the user of the TV cellular phone 25 and prepares for storing moving images (steps A55 and A56/FIG. 10).

Figure 12:
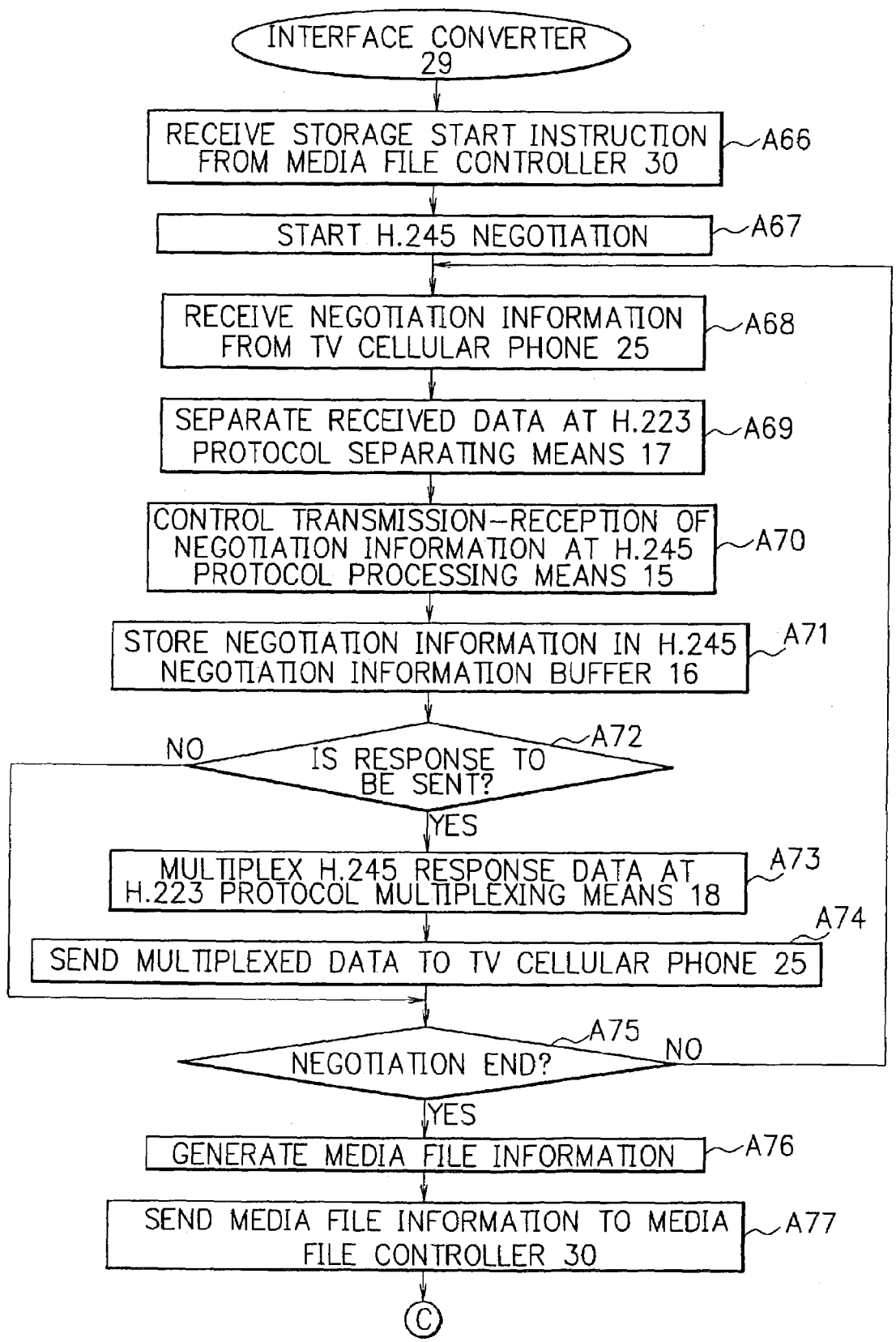
FIG. 12 is a flowchart showing the early part of the example operation of process 7 at the interface converter.

On the other hand, when the interface converter 29 receives the storage start instruction from the media file controller 30 (step A66/FIG. 12), negotiations on the communication based on the H. 245 communication control protocol start between the TV cellular phone 25 and interface converter 29 via the switching unit 27 and TV cellular phone network 31 (step A50/FIG. 9, step A67/FIG. 12).

In the interface converter 29, the H. 223 protocol separating means 17 receives information about the negotiations via the inputting means 13 (step A51/FIG. 9, step A68/FIG. 12), and separates multiplexed data based on the H. 223 multiplex protocol (step A69/FIG. 12) to send the separated data to the H. 245 protocol processing means 15.

The H. 245 protocol processing means 15 controls transmission-reception of the negotiation information to store or send the information (step A70/FIG. 12). The negotiation information about the established communication is stored in the H. 245 negotiation information buffer 16 (step A71/FIG. 12), or sent to the H. 223 protocol multiplexing means 18 (step A72/FIG. 12).

Having received the negotiation information, the H. 223 protocol multiplexing means 18 multiplexes it (step A73/FIG. 12), and sends the multiplexed data to the TV cellular phone 25 via the outputting means 24 (step A74/FIG. 12).

After the negotiations are closed (step A52/FIG. 9, step A75/FIG. 12), the media file information is generated using the negotiation information that was received at the H. 245 protocol processing means 15 and stored in the H. 245 negotiation information buffer 16 (step A76/FIG. 12). The generated media file is sent to the media file controller 30 via the outputting means 24 (step A77/FIG. 12).

When the H. 223 protocol separating means 17 of the interface converter 29 receives the voice/image bit stream through the inputting means 13 (step A53/FIG. 9, step A78/FIG. 13), the H. 223 protocol separating means 17 carries out separative processing for the received data in order of receipt based on the H. 223 multiplex protocol (step A79/FIG. 13), and sends the voice frames and image frames to the output timing means 21 according to the order in which they have been separated.

Figure 13:
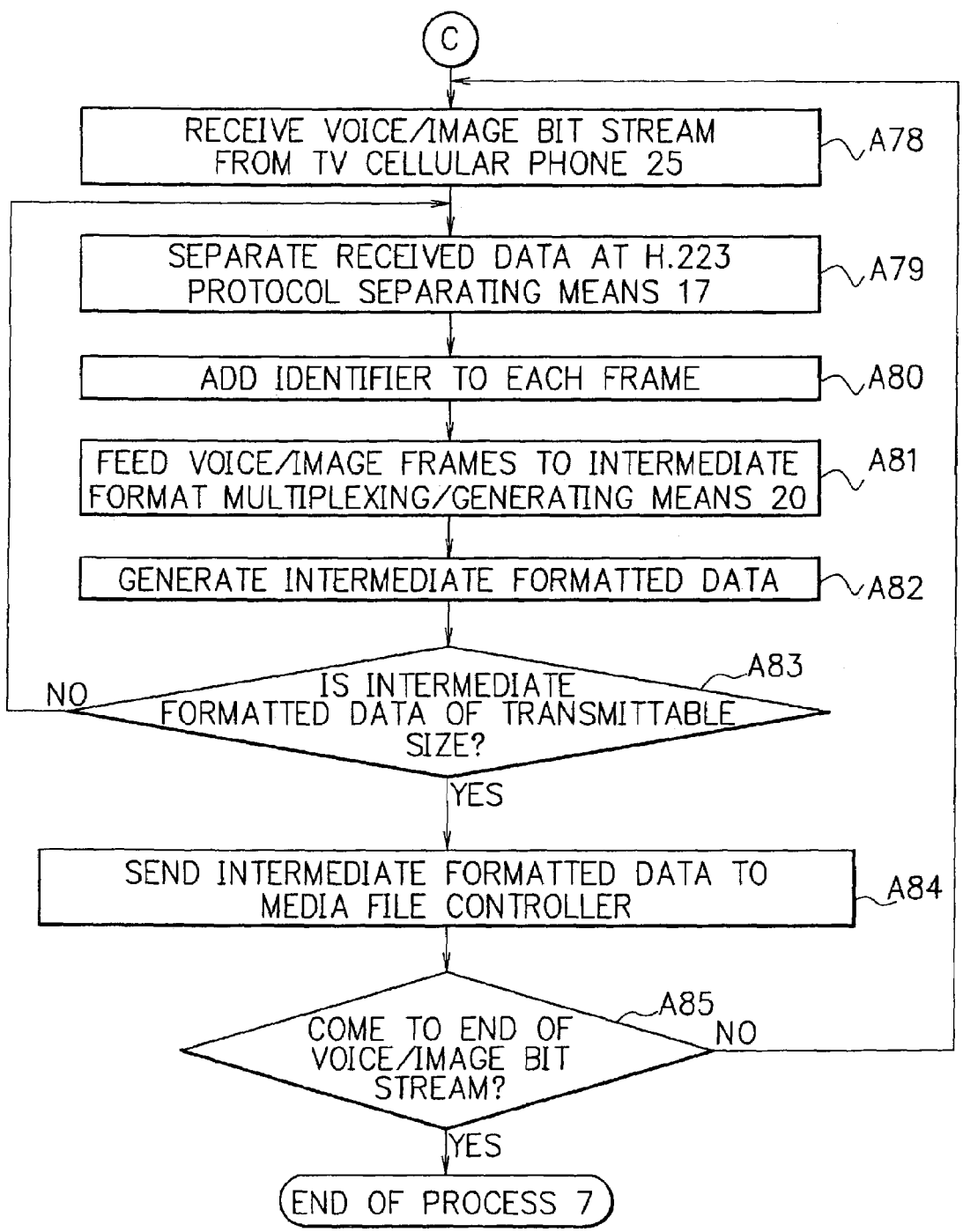
FIG. 13 is a flowchart showing the latter part of the example operation of process 7 at the interface converter.

The output timing means 21 performs order control of the separated voice frames and image frames so as not to damage the synchronization of voice data and image data, and adds an identifier for indicating voice or image to each of the frames (step A80/FIG. 13). Then, the output timing means 21 sends the frames to the intermediate format multiplexing/generating means 20 (step A81/FIG. 13).

Having received the voice frames and image frames from the output timing means 21, the intermediate format multiplexing/generating means 20 reassemble the frames in order of receipt according to the intermediate format to produce the intermediate formatted data (steps A82 and A83/FIG. 13). The intermediate formatted data is sent to the outputting means 24.

The outputting means 24 sends the intermediate formatted data to the media file controller 30 (steps A84 and A85/FIG. 13), and thus process 7 is completed.

Having received the intermediate formatted data generated by the interface converter 29 and media file information (steps A62, A63 and A64/FIG. 11), the media file controller 30 sends them to the storage 33 (step A65/FIG. 11), and process 6 is completed. The storage 33 stores the intermediate formatted data and media file information in relation to the user information (steps A57 and A58/FIG. 10), and process 5 is completed.

As set forth hereinabove, in accordance with the method, apparatus and system for transmitting moving image data of the present invention, it is possible to generate voice/image bit streams transmitted to H. 324 terminals (TV cellular phones) from media files formed in various formats such as MPEG and ASF by converting data into intermediate formatted data. Incidentally, the intermediate format is a compatible format to unify a variety of formats of image data in media files. The intermediate formatted data can be easily converted into a multiplex protocol format reproducible at TV cellular phones.

That is, in the moving image data transmitting system of the present invention, media files that were formed in arbitrary format for filing moving images are converted to the intermediate formatted data and stored with voice/image codec information. The intermediate formatted data is multiplexed to generate a voice/image bit stream based on the voice/image codec information. The voice/image bit stream is sent to a TV cellular phone and displayed on the phone. With this, the conventional cellular phone can reproduce image data formed by a data processing protocol in a different format.

Moreover, in accordance with the present invention, it is possible to easily support moving image files created in various formats by the use of the intermediate format. The intermediate format provides the center of the system with interface compatibility. Therefore, each TV cellular phone is not required to have software to be compatible with a variety of file formats.

Furthermore, media file information is produced from the information obtained by the H. 245 negotiation, and data compatible with a receiving terminal is formed at the time of transmission with reference to the media file information, thus enabling streaming transmission of data stored in the storage or media files stored in the media file storage in a compatible format to each receiving terminal.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A moving image data transmitting system for enabling a cellular phone to reproduce image data produced by an image data processing protocol of different formats, comprising:
    TV cellular phones having a TV phone function for receiving and reproducing transmitted dynamic images;
    a media file storage for storing media files which are formed in arbitrary format for filing moving images;
    an interface converter responsive to codec information on the voice/image data for multiplexing intermediate formatted data to generate a bit stream of voice/image data and sending the bit stream to the TV cellular phones;
    a media file controller for sending the intermediate formatted data and the codec information on the voice/image data to the interface converter; and
    a storage for storing the codec information on the voice/image data from the media file controller and the media files from the media file storage as the intermediate formatted data.

2. The moving image data transmitting system claimed in claim 1, further comprising a TV cellular phone network for interconnecting the TV cellular phones.

3. The moving image data transmitting system claimed in claim 1, further comprising:
    a TV cellular phone network for interconnecting the TV cellular phones; and
    switching units which are connected to the TV cellular phone network and communicate with the TV cellular phones by radio.

4. A moving image data transmitting apparatus for enabling a cellular phone to reproduce image data produced by an image data processing protocol of different formats, comprising:
    a media file storing means for storing media files which are formed in arbitrary format for filing moving images;
    interface converting means, responsive to codec information on the voice/image data, for multiplexing intermediate formatted data to generate a bit stream of voice/image data and sending the bit stream to TV cellular phones having a TV phone function for receiving and reproducing transmitted dynamic images;

media file controlling means for sending the intermediate formatted data and the codec information on the voice/image data to the interface converting means; and intermediate formatted data storing means for storing the codec information on the voice/image data from the media file controlling means and the media files from the media file storing means as the intermediate formatted data.

5. The moving image data transmitting apparatus claimed in claim 4, wherein:

the intermediate formatted data includes first voice frame data, second voice frame data and image frame data; and the first voice frame data precedes the second voice frame data on time axis, and the image frame data is positioned in between the first voice frame data and the second voice frame data.

6. The moving image data transmitting apparatus claimed in claim 4, wherein:

the intermediate formatted data includes first voice frame data, second voice frame data and image frame data;

the first voice frame data precedes the second voice frame data on time axis, and the image frame data is positioned in between the first voice frame data and the second voice frame data; and each of the first voice frame data, second voice frame data and image frame data is provided with an identifier.

7. A moving image data transmitting method for enabling a cellular phone having TV phone function for receiving and reproducing transmitted dynamic images to reproduce image data produced by an image data processing protocol of different formats, comprising the steps of:

storing media files which are formed in arbitrary format for filing moving images in a media file storing device;

multiplexing, in response to codec information on the voice/image data, intermediate formatted data to generate a bit stream of voice/image data and sending the bit stream through an interface converting device;

sending the intermediate formatted data and codec (code/decode) information on the voice/image data to the interface converting device by a media file controlling unit; and storing the codec information on the voice/image data from the media file controlling device and the media files from the media file storing devices as the intermediate formatted data in a storing device.

8. The moving image data transmitting method claimed in claim 7, wherein a TV cellular phone network is formed for interconnecting the TV cellular phones.

9. The moving image data transmitting method claimed in claim 7, wherein:

a TV cellular phone network is formed for interconnecting the TV cellular phones;

the intermediate formatted data includes first voice frame data, second voice frame data and image frame data; and the first voice frame data precedes the second voice frame data on time axis, and the image frame data is positioned in between the first voice frame data and the second voice frame data.

10. The moving image data transmitting method claimed in claim 7, wherein:

a TV cellular phone network is formed for interconnecting the TV cellular phones;

the intermediate formatted data includes first voice frame data, second voice frame data and image frame data;

the first voice frame data precedes the second voice frame data on time axis, and the image frame data is positioned in between the first voice frame data and the second voice frame data; and each of the first voice frame data, second voice frame data and image frame data is provided with an identifier.

* * * * *